United States Patent [19]

Matsumoto et al.

[11] Patent Number: 4,737,567
[45] Date of Patent: Apr. 12, 1988

[54] PHOSPHORUS CONTAINING COPOLEYSTER

[75] Inventors: Tetsuo Matsumoto; Takayuki Imamura; Koji Shinogi; Bunpei Imura; Eiji Ichihashi, all of Aichi, Japan

[73] Assignee: Nippon Ester Co., Ltd., Aichi, Japan

[21] Appl. No.: 919,114

[22] Filed: Oct. 15, 1986

[30] Foreign Application Priority Data

Oct. 18, 1985 [JP] Japan ................................ 60-232986

[51] Int. Cl.$^4$ ............................................ C08G 63/68
[52] U.S. Cl. .................................... 528/167; 528/193
[58] Field of Search ........................................ 528/167

[56] References Cited

U.S. PATENT DOCUMENTS 3,702,878 11/1972 Saito ................................... 260/936
4,157,436 6/1979 Endo et al. ........................... 528/167

FOREIGN PATENT DOCUMENTS 0170661 9/1985 Japan .
0240722 11/1985 Japan .
1016924 1/1986 Japan .
1055115 3/1986 Japan .
1124624 6/1986 Japan .
1136519 6/1986 Japan .

*Primary Examiner*—Harold D. Anderson
*Attorney, Agent, or Firm*—Sughrue, Mion, Zinn, Macpeak & Seas

[57] ABSTRACT

A random copolyester is described, comprising recurring moieties represented by formula (I), (II), and (III), and having an intrinsic viscosity of not less than 0.5, wherein said recurring moieties of formulae (I) and (II) are existing substantially in equimolar amount and recurring moieties of formulae (I) and (III) are present in a molar ratio of from 95/5 to 5/95

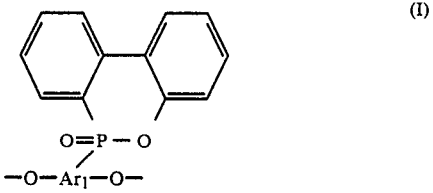

(I)

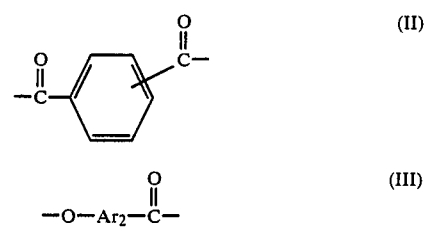

(II)

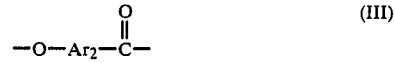

(III)

wherein $Ar_1$ represents a trivalent aromatic group and $Ar_2$ represents a divalent aromatic group. In formulae (I), (II), and (III), aromatic rings may be substituted with an alkyl group or an alkoxy group having from 1 to 20 carbon atoms, an aryl group or aryloxy group having from 6 to 20 carbon atoms, or a halogen atom. The copolyester obtained is excellent in heat resistance and flame retardance.

7 Claims, No Drawings

PHOSPHORUS CONTAINING COPOLEYSTER

FIELD OF THE INVENTION

This invention relates to a novel copolyester excellent in heat resistance and flame retardance, which is obtained from an aromatic diol containing a phosphorus atom, an aromatic dicarboxylic acid, and an aromatic hydroxycarboxylic acid.

BACKGROUND OF THE INVENTION

Aromatic polyesters are known to be heat-resistant high polymers. However, most of the conventional polyesters are difficult to process, and their application is limited.

Liquid crystalline polyesters having excellent processability and melt anisotropy have been and are now widely studied, as described in an extensive literature, e.g., U.S. Pat. Nos. 4,161,470, 4,219,461, 4,256,624, 4,279,803, 4,299,756, 4,318,841, 4,318,842, 4,330,457, and 4,337,190, Japanese Patent Publication No. 40976/83, Japanese Patent Application (OPI) Nos. 136098/78, 43296/79, 87422/82, 62630/83, 91812/83, 91816/83, and 85733/84, etc. (the term "OPI" used herein means "unexamined published application").

Aromatic polyesters, though generally regarded as excellent in flame retardance, have a limiting oxygen index (hereinafter described) of about 40 at the highest, that does not always provide sufficient flame retardant properties. Further, they should be processed at high temperatures under high pressure because of their very high melting points and high melt viscosities. Exposure to high temperatures for long periods of time is not only unfavorable in view of decomposition of the polyesters, but also economically disadvantageous.

On this account, development of the liquid crystalline polyesters having excellent flame retardance and melt processability have generated much interest, and many proposals have hitherto been made.

Nevertheless, conventional liquid crystalline polyesters as described in the above-described literature are still insufficient in flame retardance and also require high temperatures, usually above 330° C., for melt processing. It has thus been considered extremely difficult for polyesters to have both good melt processability and good flame retardance simultaneously.

SUMMARY OF THE INVENTION

Accordingly, one object of this invention is to provide a polyester particularly suitable for use at high temperatures.

Another object of this invention is to provide a copolyester having satisfactory melt processability and also high flame retardance.

As a result of extensive investigations on flame retardant polyesters free from the above-described problems, it has now been found that a phosphorus-containing copolyester having a specific structure possesses superior properties.

The present invention is thus directed to a random copolyester comprising recurring moieties represented by formulae (I), (II), and (III), and having an intrinsic viscosity of not less than 0.5, wherein said recurring moieties of formulae (I) and (II) are existing substantially in equimolar amount and recurring moieties of formulae (I) and (III) are present in a molar ratio of from 95/5 to 5/95.

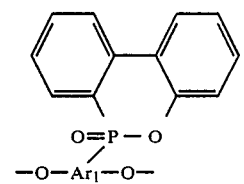

(I)

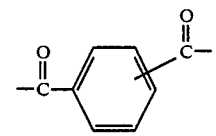

(II)

(III)

wherein $Ar_1$ represents a trivalent aromatic group and $Ar_2$ represents a divalent aromatic group. In formulae (I), (II), and (III), aromatic rings may be substituted with an alkyl group or any alkoxy group having from 1 to 20 carbon atoms, an aryl group or aryloxy group having from 6 to 20 carbon atoms, or a halogen atom.

DETAILED DESCRIPTION OF THE INVENTION

The copolyesters according to the present invention may be crystalline, amorphous, or thermotropic (optically anisotropic on heating) liquid crystalline, depending on the monomer composition. If special importance is to be given to heat resistance, crystalline copolyesters naturally having high melting points are preferred, while thermotropic liquid crystalline copolyesters are particularly suitable in order to meet requirements of both heat resistance and melt-processability.

The terminology "thermotropic liquid crystalline" means a property such that polyester molecules are regularly oriented in one direction in a molten state, to form liquid crystals referred to as a nematic meso phase. The existence of such a liquid crystal state can be confirmed by a known polarimetric technique using a crossed polarizer, as described in literatures, e.g., W. H. de Jeu, *Physical Properties of Liquid Crystalline Materials*, Gordon and Breach Science Publishers (1980) and U.S. Pat. No. 4,161,470.

The copolyesters according to the present invention comprise at least three recurring moieties and have a melting point (initial flow temperature in the case of thermotropic liquid crystalline or amorphous polyesters) usually below 330° C., and preferably below 300° C., below which they form a thermotropic liquid crystalline molten state having extremely high processability.

The first recurring moiety represented by formula (I) which constitutes the copolyester of the present invention is based on an aromatic diol containing phosphorus atom. In formula (I), the trivalent aromatic group as represented by $Ar_1$ preferably includes a benzene ring and a naphthalene ring. These aromatic rings may be substituted with an alkyl group or an alkoxy group having from 1 to 20 carbon atoms, an aryl group or an aryloxy group having from 6 to 20 carbon atoms, or a halogen atom.

Specific examples of the phosphorus-containing aromatic diol include organic phosphorus compounds represented by the following formulae (a) to (d).

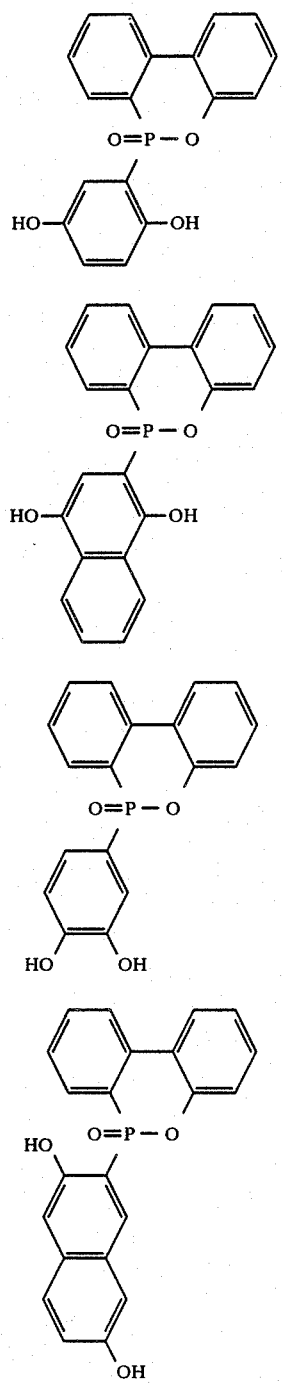

Of these aromatic diols, the compounds of formulae (a) and (b) are particularly preferred.

The second recurring moiety represented by formula (II) which constitutes copolyesters of the present invention is based on the aromatic dicarboxylic acids, preferably terephthalic acid and isophthalic acid. It is desirable to use terephthalic acid and isophthalic acid at a molar ratio of from 100/0 to 0/100, more preferably from 100/0 to 50/50, and most preferably from 100/0 to 70/30. A molar ratio of the recurring moieties (I) and (II) must be substantially equivalent by means of a stoichiometric restriction.

The third recurring moiety represented by formula (III) which constitutes the copolyester of the present invention is derived from hydroxycarboxylic acids, such as 4-hydroxybenzoic acid, 6-hydroxy-2-naphthoic acid, and the like. In these hydroxycarboxylic acids, aromatic rings may be substituted with an alkyl group or alkoxy group having from 1 to 20 carbon atoms, an aryl group or an aryloxy group having from 6 to 20 carbon atoms, or a halogen atom.

A molar ratio of the recurring moiety of formula (I) to the recurring moiety of formula (III) usually ranges from 95/5 to 5/95, and preferably from 90/10 to 10/90. If thermotropic liquid crystalline copolyesters are desired, the (I)/(III) molar ratio is typically from 90/10 to 10/90. If the proportion of the moiety (I) to the moiety (III) exceeds 95/5, strength or heat resistance of the resulting copolyester is deteriorated. On the other hand, an excessive proportion of the moiety (III) to the moiety (I) results in too a high melting point or inferior flame retardance.

The copolyesters of the present invention may further comprise other comonomers provided that the desired performance properties of the resulting copolyesters are not impaired. Such copolymerizable components preferably include resorcin, hydroquinone, 4,4'-dihydroxydiphenyl, naphthalic acid, 2,2-bis(4'-carboxyphenyl)propane, bis(4-carboxyphenyl)methane, bis(4-carboxyphenyl)ether, trimellitic acid, ethylene glycol, 1,4-butanediol, 1,6-hexanediol, cyclohexane dimethanol, 2-butene-1,4-diol, pentaerythritol, etc.

The copolyesters of the present invention usually have an intrinsic viscosity $[\eta]$ of not less than 0.5, preferably of from 1.0 to 10.0, and more preferably of from 1.0 to 5.0. If $[\eta]$ is smaller than 0.5, heat resistance as well as other various physical, mechanical, and chemical characteristics are deteriorated. An intrinsic viscosity larger than 10.0 sometimes results in impairment of melt-processability, fluidity, etc., due to an excessively high melt viscosity.

An economically advantageous process for preparing the copolyesters of the present invention will be described below taking, for instance, a copolyester comprising a recurring moiety of formula (I) which is based on a phosphorus compound of formula (a), i.e., 9,10-dihydro-9-oxa-10-(2',5'-dihydroxyphenyl)phosphaphenan-threne-10-oxide (PHQ), and a recurring moiety of formula (II) which is based on aromatic dicarboxylic acid components consisting of terephthalic acid (TPA) and/or isophthalic acid (IPA) and a recurring moiety of formula (III) which is derived from 4-hydroxybenzoic acid (4HBA).

In a reactor are charged acid components (TPA/IPA), a diol component (PHQ), and a hydroxycarboxylic acid component (4HBA) in such amounts that hydroxyl groups and carboxylic groups are equivalent, and preferably acetic anhydride in an amount at least equivalent (preferably 1.05 to 1.25 times equivalent) to the hydroxyl groups. Alternatively, the acid components (TPA/IPA), a diol component comprising a diacetate of PHQ (PHQ-A) and a hydroxycarboxylic component comprising an acetate of 4HBA (4HBA-A) are charged in a reactor in such amounts that hydroxyl groups and carboxyl groups are equivalent, preferably together with acetic anhydride in an amount up to 0.25 times equivalent to the hydroxyl groups. The resulting mixture is subjected to acid-exchange reaction and/or esterification at a temperature of about 150° C. for a period of about 2 hours. Thereafter, the temperature is gradually elevated to remove acetic acid by distillation (if necessary, under reduced pressure) to cause acid-exchange, and then further elevated to about 280° C. When the temperature finally reaches (usually) from about 280° to 330° C., the reaction mixture is maintained in a molten phase or solid phase under a reduced pressure of about 1 Torr for a period of from the minimal time in a unit of ten minutes to several hours to effect polycondensation to thereby prepare a copolyester of the present invention.

As described above, the reaction system is solidified during the polycondensation reaction and the reaction proceeds in the solid state, or the reaction proceeds in the liquid state, as depending on the kind if polyesters.

Catalysts are usually employed for polycondensation. In the preparation of the copolyesters of the present invention, at least one compound selected from various metal compounds and organic sulfonic acids can be used as a catalyst. Examples of the metal compounds to be used include compounds of antimony, titanium, germanium, tin, zinc, aluminum, magnesium, calcium, sodium, manganese, cobalt, etc. Examples of the organic sulfonic acids to be used include sulfosalicylic acid. o-sulfobenzoic anhydride, and the like. Of these, dimethyltin maleate and o-sulfobenzoic anhydride are particularly preferred. Such a catalyst is usually used in an amount of from $0.1 \times 10^{-4}$ to $100 \times 10^{-4}$ mol, preferably from $0.5 \times 10^{-4}$ to $50 \times 10^{-4}$ mol, and more preferably from $1 \times 10^{-4}$ to $10 \times 10^{-4}$ mol, per mol of ester bond.

The present invention is now illustrated in greater detail with reference to the following examples, but it should be understood that they are not intended to limit the present invention. In these examples, intrinsic viscosities of polymers were determined from solution viscosities as measured in a mixed solvent of phenol and tetrachloroethane (1/1 by weight) at 20° C. by the use of an Ostwald viscometer (AUM-105E Model, manufactured by Yamato Kagaku Ltd.). Melting points of polymers were measured by the use of a differential scanning calorimeter (DSC-2 Model, manufactured by Perkin-Elmer) at a heating rate of 20° C./min.

When a melting point of a polymer was not distinct, the temperature at which the polymer begins to flow (initial flow temperature) as determined by the following method was taken as a thermal characteristic in place of a melting point. That is, the polymer which is preheated at 200° C. for 3 minutes is heated at a heating rate of 10° C./min from an initial temperature of 200° C. under a load of 100 kg/cm² in a flow tester (CFT-500 Model, manufactured by Shimazu Seisakusho Ltd.), and the temperature at which the polymer begins to flow from a die having a diameter of 0.5 mm and a length of 2.0 mm was measured.

Flame retardance of a polymer was evaluated by ratings according to UL94 Standard and a limiting oxygen index (LOI) according to JIS K7201 Standard.

Liquid crystalline polyesters of the present invention were identified through infrared spectra, initial flow temperature, and elementary analytical values, and their liquid crystalline properties were confirmed under a Leitz polarizing microscope equipped with a hot stage.

Further, the abbreviations in the example have the following definitions:

PHQ: 9,10-dihydro-9-oxa-10-(2',5'-dihydroxyphenyl)-phosphaphenan-threne-10-oxide;
PHQ-A: a diol component comprising a diacetate of PHQ;
TPA: terephthalic acid;
IPA: isophthalic acid;
4HBA: 4-hydroxybenzoic acid;
4HBA-A: a hydroxycarboxylic component comprising an acetate of 4HBA;
RS: resorcin; and
HQ: hydroquinone.

EXAMPLE 1

A reaction apparatus was charged with PHQ-A, 4HBA-A and acetic anhydride at a molar ratio of 2.5/7.5/2 and TPA/IPA (90/10 by mol) in an amount equimolar to PHQ-A. Dimethyltin maleate was then added thereto as a catalyst in an amount of $4 \times 10^{-4}$ mol per mol of ester bond. The mixture was allowed to react at 150° C. under normal pressure for 2 hours while stirring in a nitrogen atmosphere. The reaction was further continued at 250° C. under normal pressure for 2 hours, and then at 280° C. for 2 hours. Then, pressure reduction was started, and the temperature was gradually elevated and the mixture subjected to a series of reduced pressure and elevated temperature stages, such as at 200 Torr and 280° C. for about 30 minutes, at 30 Torr and 290° C. for about 30 minutes, and then at 3 Torr and 300° C. for about 30 minutes, ultimately at less than 1 Torr and up to 320° C., to effect polymerization in a molten state for a total period of 10 hours.

The resulting copolyester was a heat-resistant and flame-retardant polymer excellent in color tone, and had an intrinsic viscosity of 2.98, an initial flow temperature of 287° C., a V-O grade in accordance with UL94, and an LOI of 61.

An infrared spectrum of the copolyester showed absorption due to C=O of the aromatic carboxylic acid ester at 1740κ, absorption due to p-substituted aromatic groups at 795κ, absorption due to o-substituted aromatic groups at 715κ, and absorption due to the asymmetric tri-substituted aromatic group at 850κ.

Elementary Analysis: Calc'd. (%): C 69.3, H 3.34, P 3.80. Found (%): C 70.4, H 3.36, P 3.66.

These analytical results as well as observation under a Leitz polarizing microscope revealed that the resulting polymer was a thermotropic liquid crystalline copolymer having the recurring moieties.

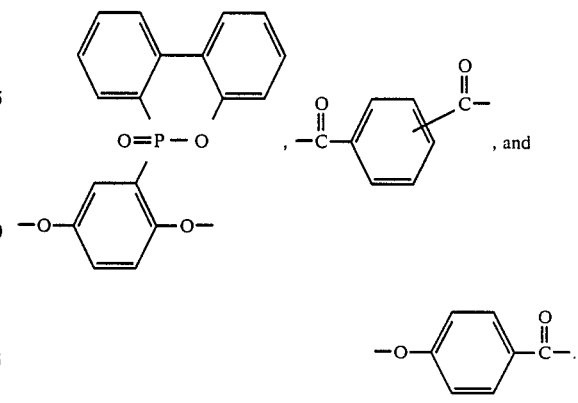

The results are further set forth in Table 1 below.

EXAMPLES 2 TO 4

A liquid crystalline copolyester was prepared in the same manner as described in Example 1 but changing the molar ratio of PHQ-A and 4HBA-A or the molar ratio of TPA and IPA as indicated in Table 1. Each of the resulting polymers was identified by an infrared spectrum, observation under a Leitz polarizing microscope, an initial flow temperature determination, and an elementary analysis. The results obtained are set forth in Table 1 below.

EXAMPLE 5

A reaction apparatus was charged with PHQ, 4HBA, and acetic anhydride at a molar ratio of 7/3/18 and TPA in an amount equimolar to PHQ. Dimethyltin maleate was then added thereto as a catalyst in an amount of $4 \times 10^{-4}$ mol per mol of the ester bond. The mixture was allowed to react at 150° C. under normal pressure for 2 hours while stirring in a nitrogen atmosphere. The reaction was further continued under normal pressure at 250° C. for 2 hours and then at a pressure of 50 Torr and at 260° C. for additional 2 hours. After the solidified reaction mixture was ground, the reaction was again started at a temperature of 150° C. under reduced pressure of 0.1 Torr, followed by gradually elevating the reaction temperature ultimately up to 320° C. to effect solid phase polymerization for a total period of 15 hours.

The resulting copolyester was a heat-resistant and flame-retardant polymer excellent in color tone, and showed an intrinsic viscosity of 0.97, an initial flow temperature of 343° C., a V-O grade in accordance with UL94, and an LOI of 65.

Infrared Spectrum: 1740κ (C=O of the aromatic carboxylic acid ester), 795κ (p-substituted aromatic groups) and 850κ (asymmetric tri-substituted aromatic group).

Elementary Analysis: Calc'd. (%): C 68.9, H 3.33, P 6.12. Found (%): C 67.7, H 3.43, P 5.91.

These analytical results as well as observation under a Leitz polarizing microscope revealed that the resulting polymer was a thermotropic liquid crystalline copolyester having the recurring moieties.

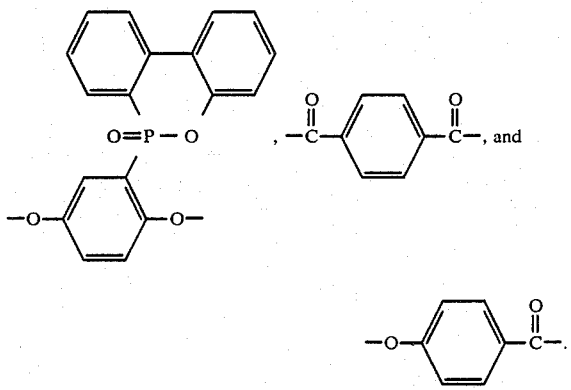

EXAMPLE 6

A reaction apparatus was charged with PHQ, resorcin (RS), 4HBA, and acetic anhydride at a molar ratio of 6/1/3/19 and TPA/IPA (60/40 by mol) in an amount equimolar to the sum of PHQ and RS. To the mixture was added $4 \times 10^{-4}$ mol of dimethyltin maleate per mol of the ester bond as a catalyst. The mixture was allowed to react at 150° C. under normal pressure for 2 hours while stirring in a nitrogen atmosphere. The reaction was continued at 250° C. under reduced pressure for 2 hours and then at 260° C. under a pressure of 50 Torr for 2 hours. After the solidified reaction mixture was once ground, the reaction was again started at a temperature of 150° C. under reduced pressure of 0.1 Torr. The reaction temperature was gradually elevated up to 320° C. to effect solid phase polymerization for a total period of 15 hours.

The resulting copolyester was a heat-resistant and flame-retardant polymer excellent in color tone and showed an intrinsic viscosity of 0.85, an initial flow temperature of 304° C., a V-O grade in accordance with UL94, and an LOI of 61.

Infrared Spectrum: 1740κ (C=O of the aromatic carboxylic acid ester), 795κ (p-substituted aromatic groups), 715κ (o-substituted aromatic groups), 776κ (m-substituted aromatic groups), and 850κ (asymmetric tri-substituted aromatic group)

Elementary Analysis: Calc'd. (%): C 69.0, H 3.33, P 5.59. Found (%): C 64.3, H 3.42, P 5.21.

These analytical results as well as observation under a Leitz polarizing microscope identified the resulting polymer to be a thermoplastic liquid crystalline copolyester having the recurring moieties.

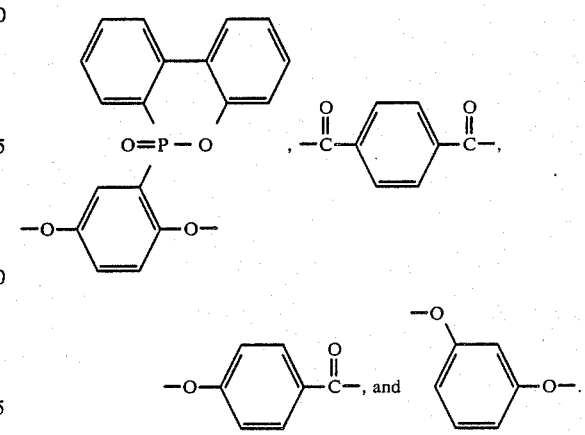

EXAMPLE 7

A reaction apparatus was charged with PHQ, hydroquinone (HQ), RS, 4HBA, and acetic anhydride at a molar ratio of 5/1/1/3/21 and TPA/IPA (60/40 by mol) in an amount equimolar to the sum of PHQ, HQ, and RS. As a catalyst, $4 \times 10^{-4}$ mol of dimethyltin maleate per mol of the ester bond was added thereto. The mixture was allowed to react at 150° C. under normal pressure for 2 hours while stirring under a nitrogen atmosphere. The reaction was further continued at 250° C. under normal pressure for 2 hours and then at 260° C. under a pressure of 50 Torr for 2 hours. After the solidified reaction mixture was once ground, the reaction was again started at a temperature of 150° C. under a reduced pressure of 0.1 Torr, followed by gradually elevating the reaction temperature finally to 320° C. to thereby effect solid phase polymerization over a total period of 15 hours.

The resulting copolyester was a heat-resistant and flame-retardant polymer excellent in color tone and showed an intrinsic viscosity of 1.12, an initial flow temperature of 317° C., a V-O grade in accordance with UL94, and an LOI of 62.

Infrared Spectrum: 1740κ (C=O of the aromatic carboxylic acid ester), 795κ (p-substituted aromatic groups), 715κ (o-substituted aromatic groups), 778κ (m-substituted aromatic groups), and 850κ (asymmetric tri-substituted aromatic group)

Elementary Analysis: Calc'd. (%): C 69.1, H 3.33, P 4.98. Found (%): C 64.2, H 3.08, P 4.66.

The results obtained are shown in Table 2. From these analytical results as well as observation under a Leitz polarizing microscope revealed that the resulting polymer was a thermotropic liquid crystalline copolymer having the recurring moieties.

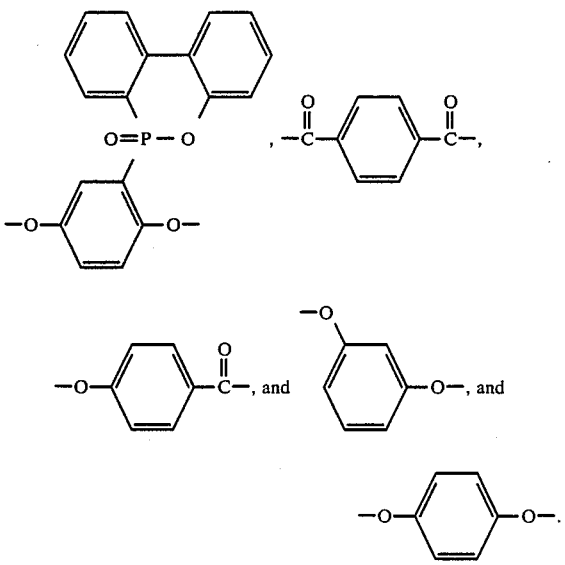

EXAMPLES 8 TO 27

Liquid crystalline copolyesters were prepared in the same manner as described in Example 5, except using PHQ, 4HBA, RS, HQ, TPA, and IPA at the molar ratios indicated in Table 3. The resulting liquid crystalline copolyesters were identified by infrared spectra, observation under a Leitz polarizing microscope, initial flow temperature and elementary analyses.

The results obtained are shown in Table 3.

EXAMPLES 28 TO 30

Liquid crystalline copolyesters were prepared in the same manner as in Example 5, except replacing PHQ with other phosphorus compounds as set forth in Table 4. The resulting liquid crystalline copolyesters were identified by infrared spectra, observation under a Leitz polarizing microscope, initial flow temperature and elementary analyses. The results obtained are shown in Table 4.

EXAMPLES 31 TO 35

Copolyesters were prepared in the same manner as described in Example 1, except changing the molar ratio of PHQ-A to 4HBA-A or the molar ratio of TPA to IPA as indicated in Table 5. The resulting amorphous copolyesters were identified by infrared spectra, initial flow temperature, and elementary analyses. The results obtained are also shown in Table 5.

EXAMPLES 36 TO 40

Copolyesters were prepared in the same manner as described in Example 1, except for changing the molar ratio of PHQ-A to 4HBA-A or the molar ratio of TPA to IPA as indicated in Table 6. The resulting crystalline copolyesters were identified by infrared spectra, melting points and elementary analyses. The results obtained are shown in Table 6.

COMPARATIVE EXAMPLES 1 AND 2

The same procedures as in Example 1 were repeated except for changing the molar ratio of PHQ and 4HBA to 99/1 or 1/99. As a result, in the former case (PHQ/4HBA=99/1), the resulting polymer was a crystalline copolyester having a melting point of 402° C., which was not thermotropically transformed to a liquid crystal even when heated to its melting point or higher temperatures. Further, this polymer was too brittle to be practically used. In the latter case (PHQ/4HBA=1/99), the melting point of the resulting polymer was substantially unmeasurable since the polymer had an extremely high melting point and began to decompose at 450° C. Therefore, this polymer was of no practical use due to difficulty in melt-processing.

REFERENCE EXAMPLE 1

The copolyester obtained in Example 1 was spun at a spinning temperature of 330° C. and a rate of spinning of 300 m/min for spinning nozzles of 0.15 mm in diameter, to thereby obtain polyester fibers (750 denier/72 filaments) having a tensile strength of 15.9 g/denier and a tensile modulus of 397 g/denier.

REFERENCE EXAMPLE 2

The copolyester obtained in Example 1 was shaped into a film under the condition of 0.30 mm in slit width, 330° C. in die temperature and 30 m/min in film-forming speed, to thereby obtain a polyester film having a tensile strength of 294 MPa and a tensile modulus of 27.2 GPa.

REFERENCE EXAMPLE 3

The copolyester obtained in Example 1 was injection-molded to prepare varius specimens as specified by ASTM Standards at a molding pressure of 600 kg/cm², a resin temperature of 330° C. and a mold temperature of 40° C.

Various physical properties of the copolyester were evaluated by using these specimens in accordance with the ASTM-D method, such as D638, D790, D695, D648, D696, and D955. The results obtained were as follows. The values and abbreviations in the parentheses indicate the thickness of the specimen used and a direction of measurement, respectively.

Tensile Strength: 234 MPa (⅛ in.)
Tensile Modulus: 18.3 GPa (⅛ in.)
Bending Strength: 298 MPa (¼ in.)
Modulus in Bending: 14.0 GPa (¼ in.)
Compressive Strength: 95 MPa (½ in.)
Heat Deflection Temperature: 189° C. (¼ in.)
Coefficient of Thermal Linear Expansion:
 $-0.13 \times 10^{-5}$ cm/cm/°C. (MD)
 $8.5 \times 10^{-5}$ cm/cm/°C. (TD)
Molding Shrinkage:
 0.02% (MD)
 0.55% (TD).

TABLE 1

| Example No. | Molar Ratio PHQ/4HBA | TPA/IPA | Intrinsic Viscosity ($\eta$) | Initial Flow Temperature (°C.) | LOI | UL94 standard |
|---|---|---|---|---|---|---|
| 1 | 2.5/7.5 | 90/10 | 2.98 | 287 | 61 | V-O |
| 2 | 5/5 | 80/20 | 2.72 | 295 | 65 | V-O |
| 3 | 2.5/7.5 | 80/20 | 2.53 | 288 | 60 | V-O |
| 4 | 5/5 | 90/10 | 2.07 | 303 | 62 | V-O |

TABLE 2

| No. | PHQ/RS/HQ/4HBA | TPA/IPA | Intrinsic ($\eta$) | Initial Flow (°C.) | LOI | Standard |
|---|---|---|---|---|---|---|
| 5 | 7/0/0/3 | 100/0 | 0.97 | 343 | 65 | V-O |
| 6 | 6/1/0/3 | 60/40 | 0.85 | 304 | 61 | V-O |
| 7 | 5/1/1/3 | 60/40 | 1.12 | 317 | 62 | V-O |

TABLE 3

| Example No. | Molar Ratio PHQ/RS/HQ/4HBA | TPA/IPA | Intrinsic Viscosity ($\eta$) | Initial Flow Temperature (°C.) | LOI | UL94 Standard |
|---|---|---|---|---|---|---|
| 8 | 9/0/0/1 | 100/0 | 0.99 | 296 | 71 | V-O |
| 9 | 5/0/0/5 | 100/0 | 1.23 | 321 | 62 | V-O |
| 10 | 1/0/0/9 | 100/0 | 1.21 | 381 | 54 | V-O |
| 11 | 7/0/0/3 | 90/10 | 0.96 | 325 | 64 | V-O |
| 12 | 7/0/0/3 | 60/40 | 0.95 | 304 | 62 | V-O |
| 13 | 7/0/0/3 | 10/90 | 0.88 | 298 | 63 | V-O |
| 14 | 6/1/0/3 | 100/0 | 1.27 | 324 | 61 | V-O |
| 15 | 6/1/0/3 | 40/60 | 0.94 | 300 | 61 | V-O |
| 16 | 6/1/0/3 | 10/90 | 1.22 | 292 | 62 | V-O |
| 17 | 5/1/1/3 | 100/0 | 1.13 | 319 | 61 | V-O |
| 18 | 5/1/1/3 | 40/60 | 1.07 | 318 | 61 | V-O |
| 19 | 5/1/1/3 | 10/90 | 1.02 | 304 | 63 | V-O |
| 20 | 1/0/0/9 | 60/40 | 0.92 | 377 | 59 | V-O |
| 21 | 5/0/0/5 | 60/40 | 1.11 | 302 | 62 | V-O |
| 22 | 9/0/0/1 | 60/40 | 0.82 | 293 | 70 | V-O |
| 23 | 6/0/1/3 | 60/40 | 0.95 | 314 | 63 | V-O |
| 24 | 5/4/0/1 | 60/40 | 0.99 | 293 | 63 | V-O |
| 25 | 5/0/4/1 | 60/40 | 1.34 | 304 | 61 | V-O |
| 26 | 5/2/2/1 | 60/40 | 1.07 | 298 | 63 | V-O |
| 27 | 3/2/2/3 | 60/40 | 0.91 | 300 | 60 | V-O |

TABLE 4

| Example No. | Phosphorus Compound | Molar Ratio (b)–(d)/4HBA | TPA/IPA | Intrinsic Viscosity ($\eta$) | Initial Flow Temperature (°C.) | LOI | UL94 Standard |
|---|---|---|---|---|---|---|---|
| 28 | (b)* | 7/3 | 100/0 | 1.11 | 316 | 65 | V-O |
| 29 | (c)* | 7/3 | 100/0 | 0.97 | 298 | 63 | V-O |
| 30 | (d)* | 7/3 | 100/0 | 1.22 | 304 | 64 | V-O |

Note:
(b), (c), and (d) are the organic phosphorus compounds represented by the above-described formula (b), (c), and (d), respectively.

TABLE 5

| Example No. | Molar Ratio PHQ/4HBA | TPA/IPA | Intrinsic Viscosity ($\eta$) | Initial Flow Temperature (°C.) | LOI | UL94 Standard |
|---|---|---|---|---|---|---|
| 31 | 9/1 | 30/70 | 0.96 | 301 | 70 | V-O |
| 32 | 9/1 | 0/100 | 0.91 | 296 | 71 | V-O |
| 33 | 8/2 | 20/80 | 1.02 | 299 | 67 | V-O |
| 34 | 4/6 | 10/90 | 1.13 | 299 | 63 | V-O |
| 35 | 2/8 | 0/100 | 1.14 | 305 | 59 | V-O |

TABLE 6

| Example No. | Molar Ratio PHQ/4HBA | TPA/IPA | Intrinsic Viscosity ($\eta$) | Melting Point (°C.) | LOI | UL94 Standard |
|---|---|---|---|---|---|---|
| 36 | 0.5/9.5 | 100/0 | 1.24 | 401 | 58 | V-O |
| 37 | 0.5/9.5 | 80/20 | 1.18 | 399 | 59 | V-O |
| 38 | 0.8/9.2 | 100/0 | 1.17 | 397 | 58 | V-O |
| 39 | 9.5/0.5 | 100/0 | 1.02 | 401 | 61 | V-O |
| 40 | 9.5/0.5 | 80/20 | 0.95 | 400 | 63 | V-O |

As described above, the copolyesters in accordance with the present invention, having a specific phosphorus-containing structural unit in the side chain, do not undergo decomposition even when used at high temperatures and also exhibit high flame retardance properties after being shaped. Further, since the main chain of the copolyesters consists mainly of a 4HBA/PHQ unit and a TPA/IPA unit, these copolyesters easily form an anisotropic molten phase, and, at the same time, have melting point or initial flow temperature within a favorable range of from 300° C. to 400° C., and exhibit excellent heat resistance and melt-processability. The copolyesters in accordance with the present invention have, therefore, excellent performance properties as heat resistant high polymers. Hence, the copolymers of the present invention are useful as films, fibers, molding materials, and the like in various fields requiring high heat resistance and flame retardance.

While the invention has been described in detail and with reference to specific embodiments thereof, it will be apparent to one skilled in the art that various changes and modifications can be made therein without departing from the spirit and scope thereof.

What is claimed is:

1. A random copolyester comprising recurring moieties represented by formula (I), (II), and (III), and having an intrinsic viscosity, measured in a mixed solvent of phenol and tetrachloroethane (1/1 by weight), at 20° C., of not less than 0.5, wherein said recurring moieties of formulae (I) and (II) are present substantially in equimolar amount and recurring moieties of formulae (I) and (III) are present in a molar ratio of from 95/5 to 5/95

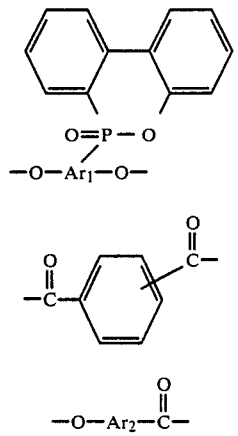

wherein Ar₁ represents a trivalent aromatic group and Ar₂ represents a divalent aromatic group and wherein said Ar₁ and Ar₂ in the formulae (I) and (III) and other aromatic rings present in the formulae (I) and (II) are unsubstituted or substituted with an alkyl group or an alkoxy group having from 1 to 20 carbon atoms, an aryl group or aryloxy group having from 6 to 20 carbon atoms, or a halogen atom.

2. A copolyester as in claim 1, wherein said copolyester is a thermotropic liquid crystalline polyester.

3. A copolyester as in claim 1, having a melting point or an initial flow temperature below 300° C.

4. A copolyester as in claim 1, wherein the molar ratio of the recurring moiety of formula (I) to the recurring moiety of formula (III) is from 90/10 to 10/90.

5. A copolyester as in claim 1, wherein said recurring moiety of formula (I) is represented by the formula

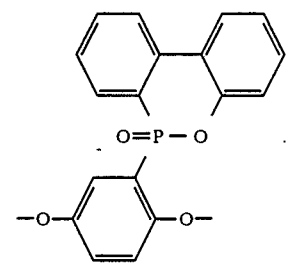

6. A copolyester as in claim 1, wherein said recurring moiety of formula (I) is represented by the formula

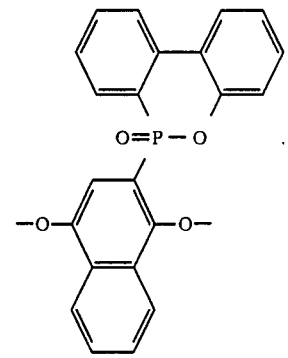

7. A copolyester as in claim 1, wherein said recurring moiety of formula (III) is represented by the formula

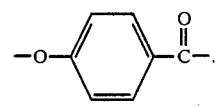

* * * * *